(12) United States Patent
Liu et al.

(10) Patent No.: US 11,099,761 B2
(45) Date of Patent: Aug. 24, 2021

(54) METHOD, DEVICE AND COMPUTER PROGRAM PRODUCT FOR EXPANDING STORAGE SPACE

(71) Applicant: EMC IP Holding Company LLC, Hopkinton, MA (US)

(72) Inventors: Yousheng Liu, Beijing (CN); Jianbin Kang, Beijing (CN); Xinlei Xu, Beijing (CN); Lifeng Yang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/249,364

(22) Filed: Jan. 16, 2019

(65) Prior Publication Data
US 2019/0220194 A1    Jul. 18, 2019

(30) Foreign Application Priority Data
Jan. 18, 2018   (CN) .......................... 201810050755.0

(51) Int. Cl.
*G06F 3/06* (2006.01)

(52) U.S. Cl.
CPC .......... *G06F 3/0647* (2013.01); *G06F 3/0604* (2013.01); *G06F 3/064* (2013.01); *G06F 3/0611* (2013.01); *G06F 3/0646* (2013.01); *G06F 3/0649* (2013.01); *G06F 3/0689* (2013.01)

(58) Field of Classification Search
CPC .... G06F 3/0689; G06F 3/0604; G06F 3/0611; G06F 3/064; G06F 3/0646; G06F 3/0647; G06F 3/0649
See application file for complete search history.

(56) References Cited

U.S. PATENT DOCUMENTS

| 5,732,239 | A   | * | 3/1998  | Tobagi .................... G06F 3/061 |
|           |     |   |         | 348/E5.008 |
| 6,065,065 | A   | * | 5/2000  | Murakami .............. G06F 16/10 |
|           |     |   |         | 709/250 |
| 6,233,648 | B1  | * | 5/2001  | Tomita .................. G06F 3/0613 |
|           |     |   |         | 711/103 |
| 7,937,421 | B2  |   | 5/2011  | Mikesell et al. |
| 8,204,871 | B1  | * | 6/2012  | Pawar ................... G06F 16/172 |
|           |     |   |         | 707/705 |
| 8,539,197 | B1  | * | 9/2013  | Marshall ................. G06F 13/00 |
|           |     |   |         | 711/173 |
| 8,924,676 | B1  |   | 12/2014 | Anderson |
| 9,025,602 | B2  |   | 5/2015  | Zhong et al. |

(Continued)

OTHER PUBLICATIONS

ComputerWeekly Thin provisioning: Over-allocation, wide striping, space reclamation by Pinder (Year: 2010).*

(Continued)

*Primary Examiner* — Paul M Knight
(74) *Attorney, Agent, or Firm* — BainwoodHuang

(57) ABSTRACT

Techniques expand storage space. Such techniques can create a storage stripe group during a shuffling operation after a storage device being added, without waiting for full completion of the shuffling operation. Such techniques can effectively reduce the waiting time for creating the storage stripe group. Besides, such techniques can support partial mapping of the storage stripe group, such that the storage resources mapped to the storage stripe group can be rapidly utilized.

13 Claims, 11 Drawing Sheets

(56) References Cited

U.S. PATENT DOCUMENTS

| | | | | |
|---|---|---|---|---|
| 9,256,381 B1* | 2/2016 | Fultz | ............... | G06F 16/185 |
| 9,875,043 B1* | 1/2018 | Suldhal | ............... | G06F 3/0665 |
| 9,875,163 B1 | 1/2018 | Douglis et al. | | |
| 10,146,459 B1 | 12/2018 | Gao et al. | | |
| 2002/0099908 A1* | 7/2002 | Yamamoto | ............... | G06F 3/0683 |
| | | | | 711/114 |
| 2005/0102551 A1* | 5/2005 | Watanabe | ............... | G06F 3/0607 |
| | | | | 714/6.2 |
| 2005/0172252 A1* | 8/2005 | Cheng | ............... | G06F 30/392 |
| | | | | 716/124 |
| 2006/0248379 A1* | 11/2006 | Jernigan, IV | ............... | G06F 3/0644 |
| | | | | 714/6.12 |
| 2008/0092143 A1* | 4/2008 | Koseki | ............... | G06F 11/3433 |
| | | | | 718/105 |
| 2016/0306574 A1* | 10/2016 | Friedman | ............... | G06F 3/0619 |
| 2018/0095676 A1* | 4/2018 | Zhao | ............... | G06F 11/1469 |
| 2018/0101456 A1* | 4/2018 | Critchley | ............... | G06F 11/1076 |
| 2019/0384518 A1* | 12/2019 | Park | ............... | G06F 3/0647 |

OTHER PUBLICATIONS

3PAR Fast RAID: High Performance Without Compromise by Swartz (Year: 2010).*

The HP AutoRAID Hierarchical Storage System by Wilkes (Year: 1996).*

\* cited by examiner

METHOD, DEVICE AND COMPUTER PROGRAM PRODUCT FOR EXPANDING STORAGE SPACE

FIELD

Embodiments of the present disclosure generally relate to the field of storage management, and more specifically, to a method and device for expanding storage space.

BACKGROUND

Redundant Array of Independent Disk (RAID) is a data storage virtualization technology that combines a plurality of physical disk drives into a single logic unit to improve data redundancy, reliability and performance. Depending on the required redundancy level and performance, data is distributed across the plurality of physical disk drives using one of the multiple RAID levels, and the multiple RAID levels are, for example, RAID 0-RAID 50 and the like. Taking the RAID 5 with a stripe width of 3 as an example, RAID 5 stores data and its corresponding parity information on each disk composed the RAID 5, and the parity information and the corresponding data are respectively located on different disks. After data on one disk of the RAID 5 is damaged, the damaged data is recovered using the remaining data and the corresponding parity information. The mapping RAID technology has already been introduced along with the development of RAID technology. However, there are still some problems to be solved in the aspect of expanding RAID storage space.

SUMMARY

Embodiments of the present disclosure provide a method and device for expanding the storage space and a corresponding computer program product.

In one aspect of the present disclosure, there is provided a method for managing a storage system. The method includes: receiving a creating request for a storage stripe group of a storage system, the creation request indicating a width of a storage stripe group to be created; during a shuffling operation executed after a storage device is added to the storage system, determining from free storage extents in the storage system target storage extents satisfying the width; and creating the storage stripe group based on the target storage extents.

In a second aspect of the present disclosure, there is provided a device for managing a storage system. The device includes at least one processing unit; and at least one memory coupled to the at least one processing unit and stored with instructions, the instructions, when executed by the at least one processing unit, performing actions of: receiving a creating request for a storage stripe group of a storage system, the creating request indicating a width of a storage stripe group to be created; during a shuffling operation executed after a storage device is added to the storage system, determining from free storage extents in the storage system target storage extents satisfying the width; and creating the storage stripe group based on the target storage extents.

In a third aspect of the present disclosure, there is provided a computer program product tangibly stored on a non-transient computer readable medium and including computer readable program instructions, which, when executed on a device, cause the device to execute the steps of the method according to the above first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1A:
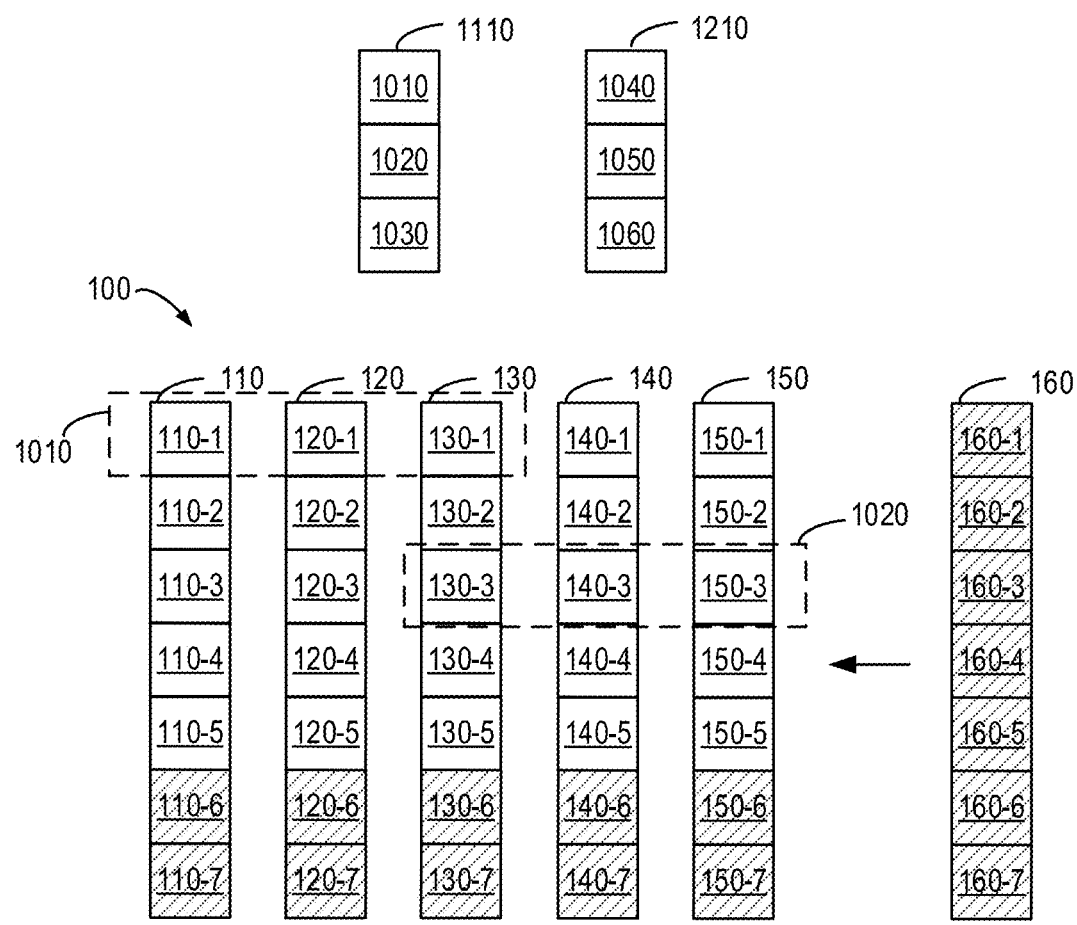
FIG. 1A to FIG. 1C illustrate a schematic diagram of expanding storage space of a traditional storage system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

In the following description, each example embodiment of the present disclosure will be described with reference to the drawings. It should be noted that the drawings and descriptions only involve example embodiments. Besides, it is also noted that the alternative embodiments of the structure and method disclosed here can be easily contemplated according to the subsequent description and the alternative embodiments can be employed without departing from the principle protected by the present disclosure.

It should be appreciated that the example embodiments are merely to enable those skilled in the art to better understand and further implement the present disclosure and are not intended for limiting the scope disclosed herein in any manner.

As used herein, the term "includes" and its variants are to be interpreted as open-ended terms that mean "includes, but is not limited to." The term "based on" is to be interpreted as "based at least in part on." The term "one example embodiment" is to be interpreted as "at least one example embodiment." The term "a further embodiment" is to be interpreted as "at least one further embodiment." Definitions of other technical terms will be present in the following description.

The term "storage device" used herein refers to devices for storing information. For example, the storage device can include: devices for storing information with electric energy (such as, RAM, ROM and the like); devices for storing information with magnetic energy (such as, hard disk, magnetic disk etc.) and so on. For the purpose of facilitating description only, the disclosure takes an example "disk" of the storage device as example for explanation. The term "storage system" used herein indicates a system composed of various storage devices for storing programs and data, control components, and devices (hardware) and algorithm (software) for managing information scheduling. For the purpose of facilitating description only, the disclosure takes an example system RAID of the storage system as example for explanation. The term "storage extent" used herein means continuous partial physical storage resources on the storage device. The term "storage stripe" used herein means continuous partial storage resources on a logic level. A storage stripe can correspond to at least one storage extent. The term "shuffling" used herein refers to a mechanism for redistributing data. The term "width of a storage stripe" used herein indicates the number of stripes that can be concurrently read or written.

In the context, a solution for storage management according to the embodiments of the present disclosure will be described in details with reference to the drawings. To facilitate description, embodiments of the present disclosure will be described in details by taking a RAID 5 with a stripe width of 3 as example. However, it should be appreciated that principles and method of embodiments of the present disclosure can be applied into the RAID at any levels or layout, and should not be limited to the following listed examples, and the protection scope of the present disclosure is not restricted in this regard.

Figure 1B:
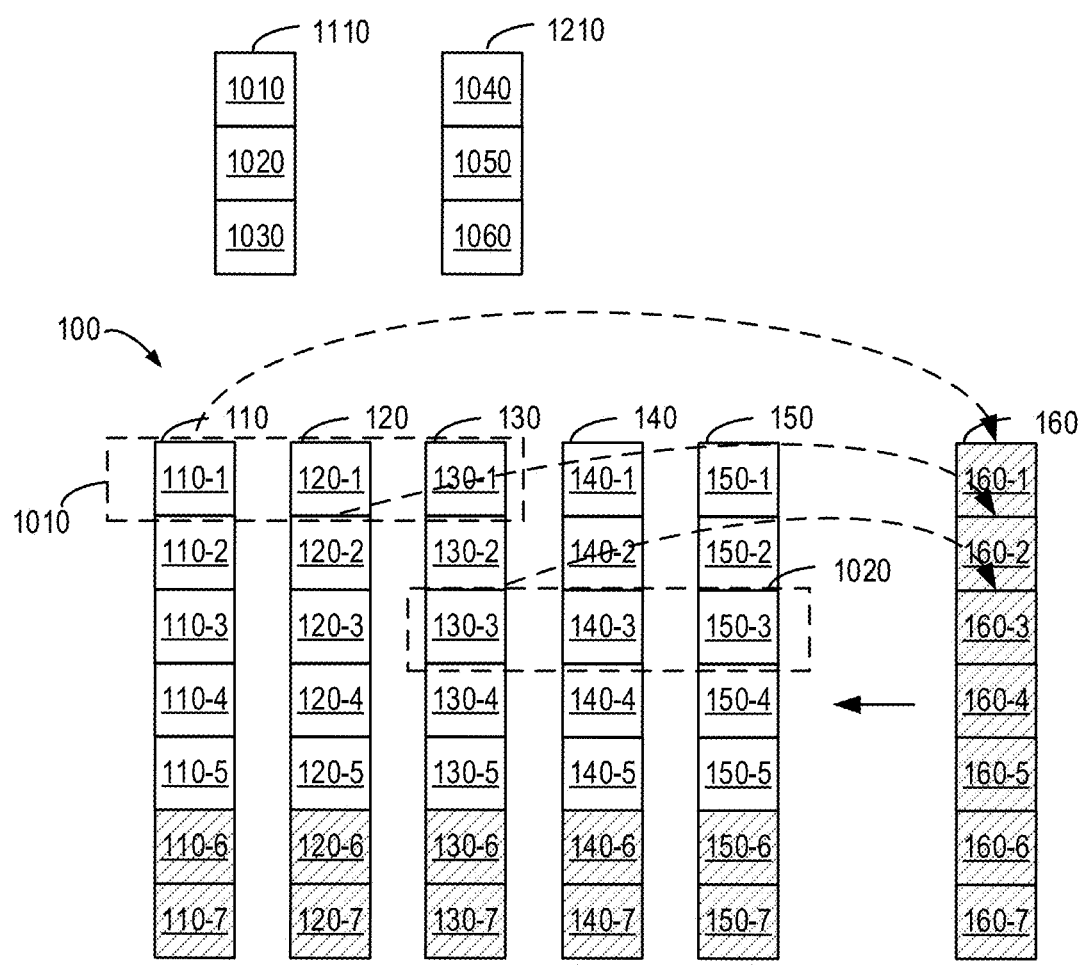
Figure 1C:
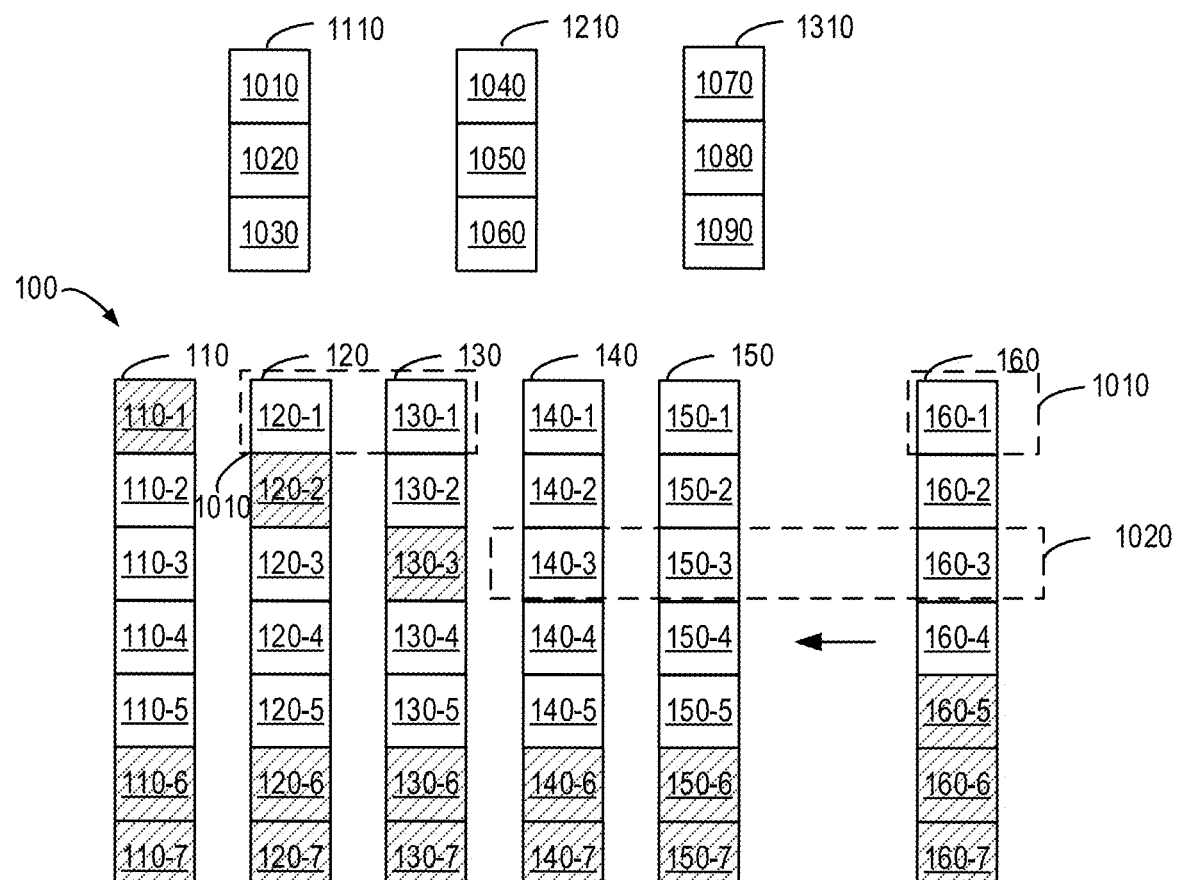

As described above, there are still some problems to be solved in the aspect of expanding RAID storage space. FIG. 1A to FIG. 1C illustrate a schematic diagram of expanding storage space of a traditional storage system 100.

As shown in FIG. 1A, the storage system 100 includes a storage device 110, a storage device 120, a storage device 130, a storage device 140 and a storage device 150. It should be appreciated that the storage system 100 can include any appropriate number of storage devices. If the existing storage system 100 cannot satisfy the demands for storage space, a new storage device 160 is added into the storage system 100. It can be understood that any appropriate number of storage devices can be added to the storage system 100.

The storage device 110 is divided into a plurality of storage extents, such as storage extents 110-1, 110-2, 110-3, 110-4, 110-5, 110-6 and 110-7. Similarly, the storage device 120 is divided into a plurality of storage extents, e.g., storage extents 120-1, 120-2, 120-3, 120-4, 120-5, 120-6 and 120-7. The storage device 130 is divided into a plurality of storage extents, such as storage extents 130-1, 130-2, 130-3, 130-4, 130-5, 130-6 and 130-7. The storage device 140 is divided into a plurality of storage extents, e.g., storage extents 140-1, 140-2, 140-3, 140-4, 140-5, 140-6 and 140-7. The storage device 150 is divided into a plurality of storage extents, such as storage extents 150-1, 150-2, 150-3, 150-4, 150-5, 150-6 and 150-7. The newly added storage device 160 is also divided into a plurality of storage extents, e.g., storage extents 160-1, 160-2, 160-3, 160-4, 160-5, 160-6 and 160-7. It can be understood that the storage device can be divided into any appropriate number of storage extents. The storage extents 110-6, 110-7, 120-6, 120-7, 130-6, 130-7, 140-6, 140-7, 150-6, 150-7, and 160-1 to 160-7 shown in FIG. 1A are free storage extents.

The storage extents 110-1, 120-1 and 130-1 are mapped to a storage stripe 1010. The storage extents 130-3, 140-3 and 150-3 are mapped to a storage stripe 1020. It can be understood that FIG. 1A to FIG. 1C illustrate the RAID 5 system with a stripe width of 3. That is, each storage stripe contains any three storage extents from different storage devices, and the three storage extents meanwhile compose the RAID 5 system. It can be appreciated that the number of storage extents included in each storage stripe will change as the stripe width of the RAID or the level of RAID alters. For example, in the RAID system with a stripe width of 4, each storage stripe includes any four storage extents from different storage devices.

A storage stripe group 1110 includes a plurality of storage stripes, e.g., storage stripes 1010, 1020 and 1030. A storage stripe group 1210 includes a plurality of storage stripes, e.g., storage stripes 1040, 1050 and 1060. It can be understood that storage stripes 1030, 1040 and 1050, although not shown, respectively include storage extents from three different storage devices.

To create a new storage stripe group, the storage system 100 starts the shuffling operation. As shown in FIG. 1B, data on the storage extent 110-1 will be transferred to the storage extent 160-1, data on the storage extent 120-2 will be transferred to the storage extent 160-2, and data on the storage extent 130-3 will be transferred to the storage extent 160-3. The shuffling operation shown in FIG. 1B is only an example and the shuffling operation normally takes several hours, and even several days.

When the shuffling operation of the storage system 100 is fully completed, the storage stripe group 1310 is created. The storage stripe group 1310 includes a plurality of storage stripes, for example, storage stripes 1070, 1080 and 1090. As shown in FIG. 1C, the storage extents 110-1, 120-2 and 130-3 become free storage extents after the shuffling operation. The storage stripes 1070, 1080 and 1090, although not shown, respectively include free storage extents from three different storage devices in the storage system 100.

In the process of expanding the storage space as shown in FIGS. 1A to 1C, the creation of the storage stripe group 1310 needs to be performed after fully completing the shuffling operation of the storage system 100, rather than during the stuffing operation. Because the storage system 100 is usually stored with a large amount of data, it takes rather long time to complete the shuffling operation. Besides, in some cases, it may not need to access all storage space of the storage stripe group 1310. In other words, a partial storage stripe can be first mapped to the storage stripe group 1310 when the storage stripe group 1310 is created. However, the conventional solution does not support partial mapping.

To at least partially solve the above problem, embodiments of the present disclosure provide a method for managing a storage system. According to embodiments of the present disclosure, a new storage stripe group is created during the shuffling operation of the storage system, thereby effectively saving time. In addition, the storage stripe group created according to embodiments of the present disclosure supports partial mapping.

Figure 3:
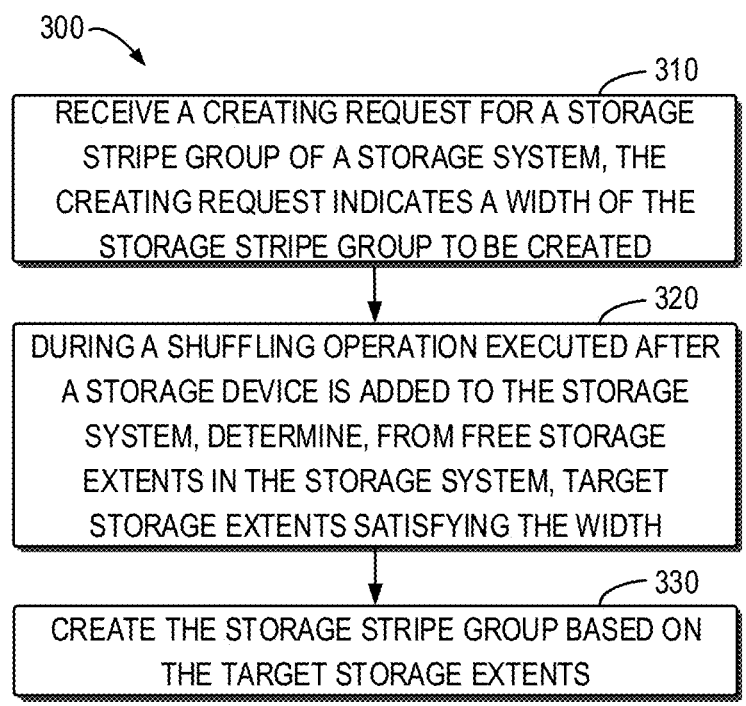
FIG. 3 illustrates a flowchart of a method 300 for managing a storage system according to embodiments of the present disclosure.
Figure 4:
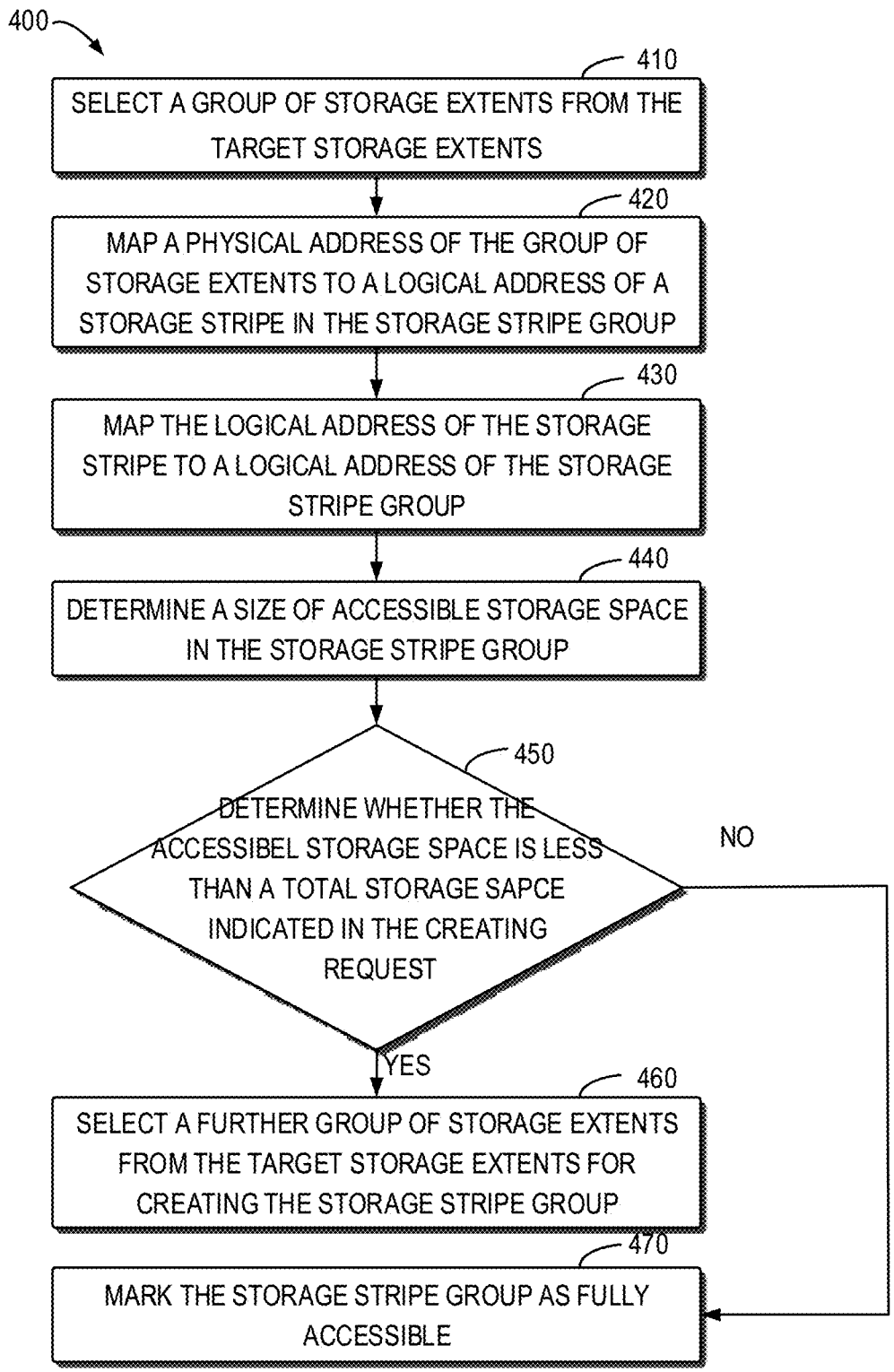
FIG. 4 illustrates a flowchart of a method 400 according to embodiments of the present disclosure.

FIG. 2A to FIG. 2D illustrate a schematic diagram of expanding storage space of the storage system according to embodiments of the present disclosure. FIG. 3 illustrates a flowchart of a method 300 for storage management according to embodiments of the present disclosure. FIG. 4 illustrates a flowchart of a method 400 according to a part of embodiments of the present disclosure. Embodiments of the present disclosure will be described in details with reference to FIGS. 2A to 2D, FIG. 3 and FIG. 4.

As shown in FIGS. 2A to 2D, the storage system 200 includes a storage device 210, a storage device 220, a storage device 230, a storage device 240 and a storage device 250. It can be understood that the storage system 200 can include any appropriate number of storage devices. The storage device 210 is divided into a plurality of storage extents, such as storage extents 210-1, 210-2, 210-3, 210-4, 210-5, 210-6 and 210-7. Similarly, the storage device 220 is divided into a plurality of storage extents, e.g., storage extents 220-1, 220-2, 220-3, 220-4, 220-5, 220-6 and 220-7. The storage device 230 is divided into a plurality of storage extents, such as storage extent 230-1, 230-2, 230-3, 230-4, 230-5, 230-6 and 230-7. The storage device 240 is divided into a plurality of storage extents, such as storage extents 240-1, 240-2, 240-3, 240-4, 240-5, 240-6 and 240-7. The storage device 250 is divided into a plurality of storage extents, e.g., storage extents 250-1, 250-2, 250-3, 250-4, 250-5, 250-6 and 250-7. It should be understood that the storage device can be divided into any appropriate number of storage extents. Only as an example, in the storage system 200 shown in FIG. 2A, 210-6, 210-7, 220-6, 220-7, 230-6, 230-7, 240-6, 240-7, 250-6 and 250-7 are free storage extents.

Figure 2A:
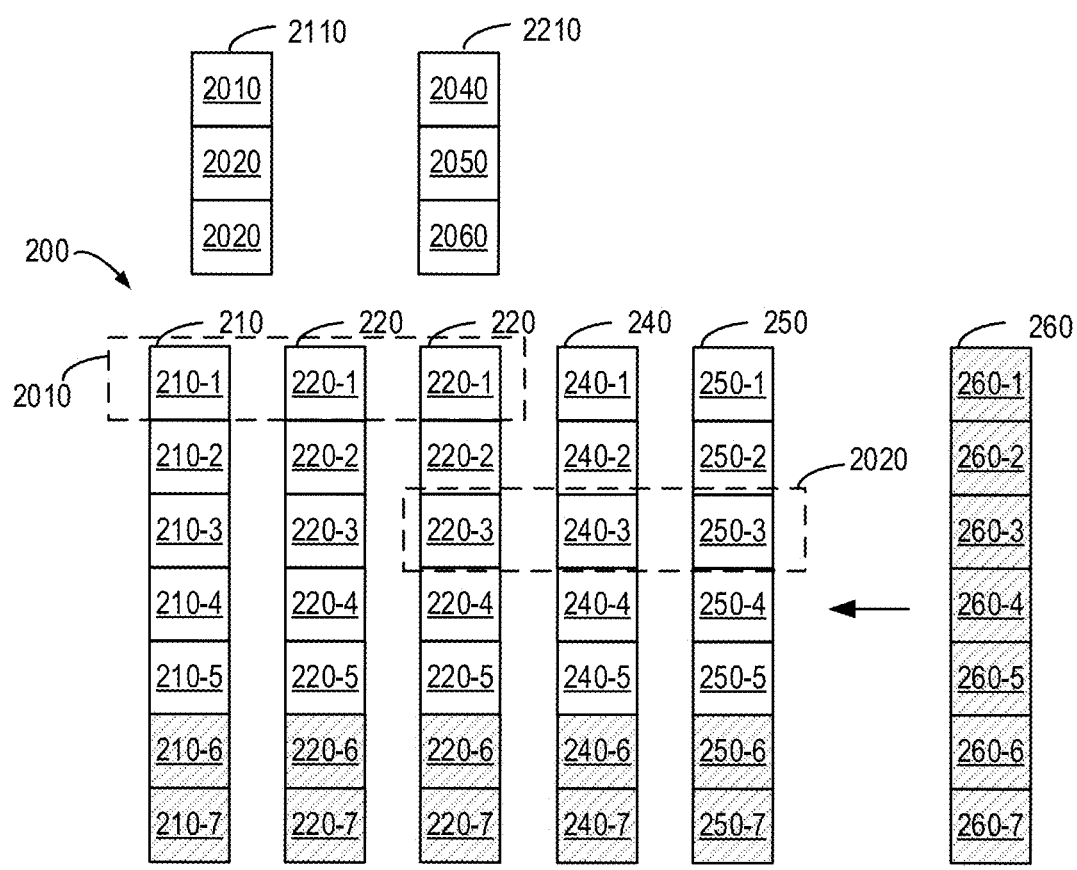
FIG. 2A to FIG. 2D illustrate a schematic diagram of expanding storage space of the storage system according to embodiments of the present disclosure.

In the example shown in FIG. 2A, the storage extents 210-1, 220-1 and 230-1 are mapped to a storage stripe 2010. The storage extents 230-3, 240-3 and 250-3 are mapped to the storage stripe 2010. The mapping relationship between the storage extents and the storage stripe shown in FIGS. 2A to 2D is only by way of example and non-restrictive. It should be understood that FIGS. 2A to 2D illustrate a RAID 5 system having a stripe width of 3. That is, each storage stripe includes any three storage extents from different storage devices. It can be appreciated that the number of storage extents included in each storage stripe will change as the stripe width of the RAID or the level of RAID varies. For example, in the RAID system with a stripe width of 4, each storage stripe includes any four storage extents from different storage devices.

In the example shown in FIGS. 2A to 2D, the storage stripe group 2110 includes a plurality of storage stripes, such as storage stripe 2010, 2020 and 2030. The storage stripe group 2210 includes a plurality of storage stripes, for example, storage stripes 2040, 2050 and 2060. Although not shown, it can be understood that the storage stripes 2030, 2040, 2050 and 2060 respectively include a plurality of storage extents from different storage devices. It can be appreciated that the number of storage stripes included in the storage stripe groups shown in FIGS. 2A to 2D is only by way of example, and the storage stripe group can include any appropriate number of storage stripes.

At block 310, the storage system 200 receives a creating request for a storage stripe group 2310 of the storage system. In some embodiments, a user or administrator can transmit a creating request of the storage stripe group 2310. In a further embodiment, the storage system 200 can create, based on its own storage space, the storage stripe group 2310. The creating request can include a width of the storage stripe group 2310. Just as an example, the storage stripe groups shown in FIGS. 2A to 2D all have the width of 3. Alternatively or in addition, the creating request can specify the total storage space of the storage stripe group 2310. In a further embodiment, the creating request further can include identification and/or logical address of the storage stripe group 2310. In some embodiments, an instance of the storage stripe group 2310 can be created first. For example, it can create a mapping table of the storage stripe group 2310. The newly created mapping table can be empty and the accessible storage space of the storage stripe group 2310 is zero.

In some embodiments, the user or administrator can discover that the storage space of the current storage system 300 cannot satisfy the storage requirements. Alternatively, in some embodiments, the free storage extents (e.g., 210-6, 210-7, 220-6, 220-7, 230-6, 230-7, 240-6, 240-7, 250-6 and 250-7) in the storage system 300 are insufficient for creating the storage stripe group 2310. The storage device 260 is added into the storage system 200 to expand the storage space of the storage system 200. It can be appreciated that any appropriate number of storage devices can be added to the storage system 300 and embodiments of the present disclosure are not restricted in this regard.

In some embodiments, after the storage device 260 is added to the storage system 200, the storage device 260 is divided into a plurality of storage extents, for example, storage extents 260-1 to 260-7. It can be understood that the storage device 260 can be divided into any appropriate number of storage extents. Because the storage device 260 is a newly added storage device, the storage extents 260-1 to 260-7 are all free storage extents.

Figure 2B:
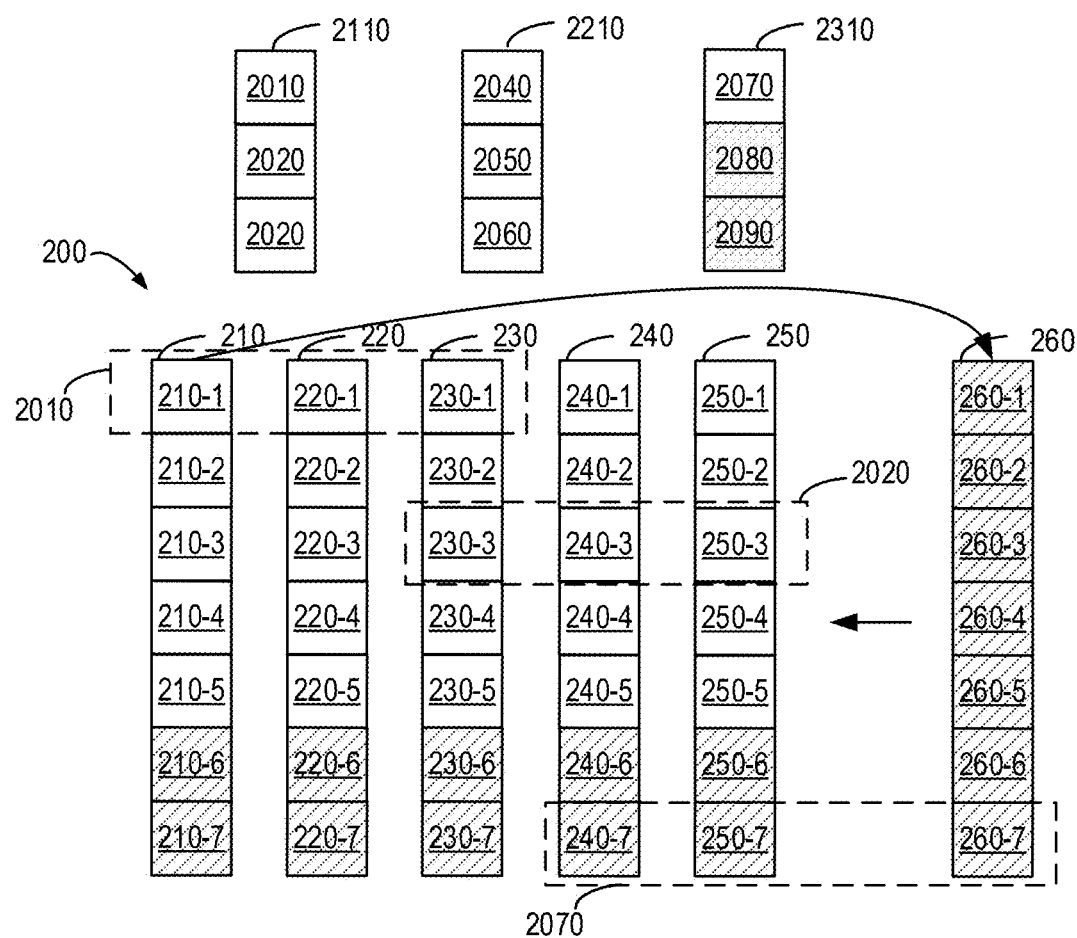
Figure 2C:
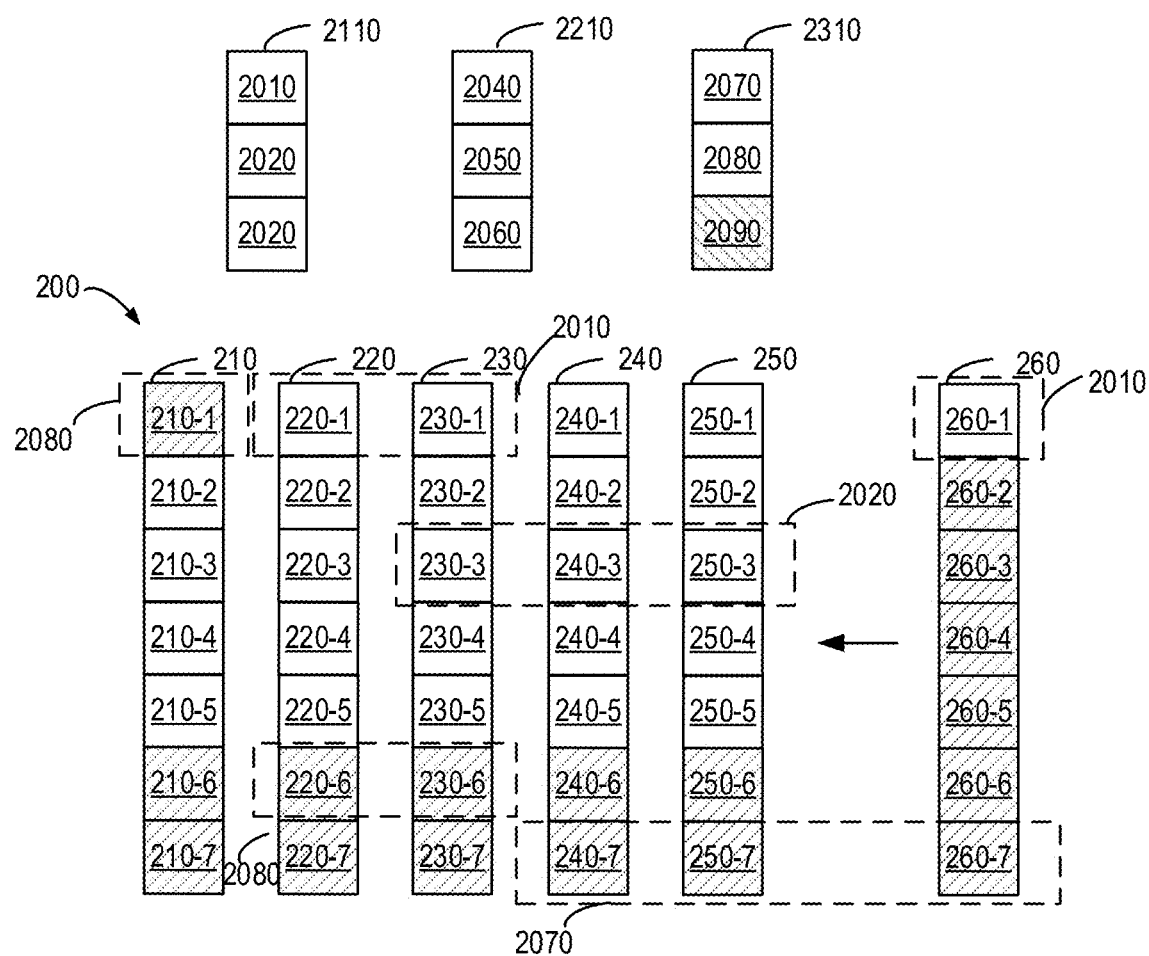
Figure 2D:
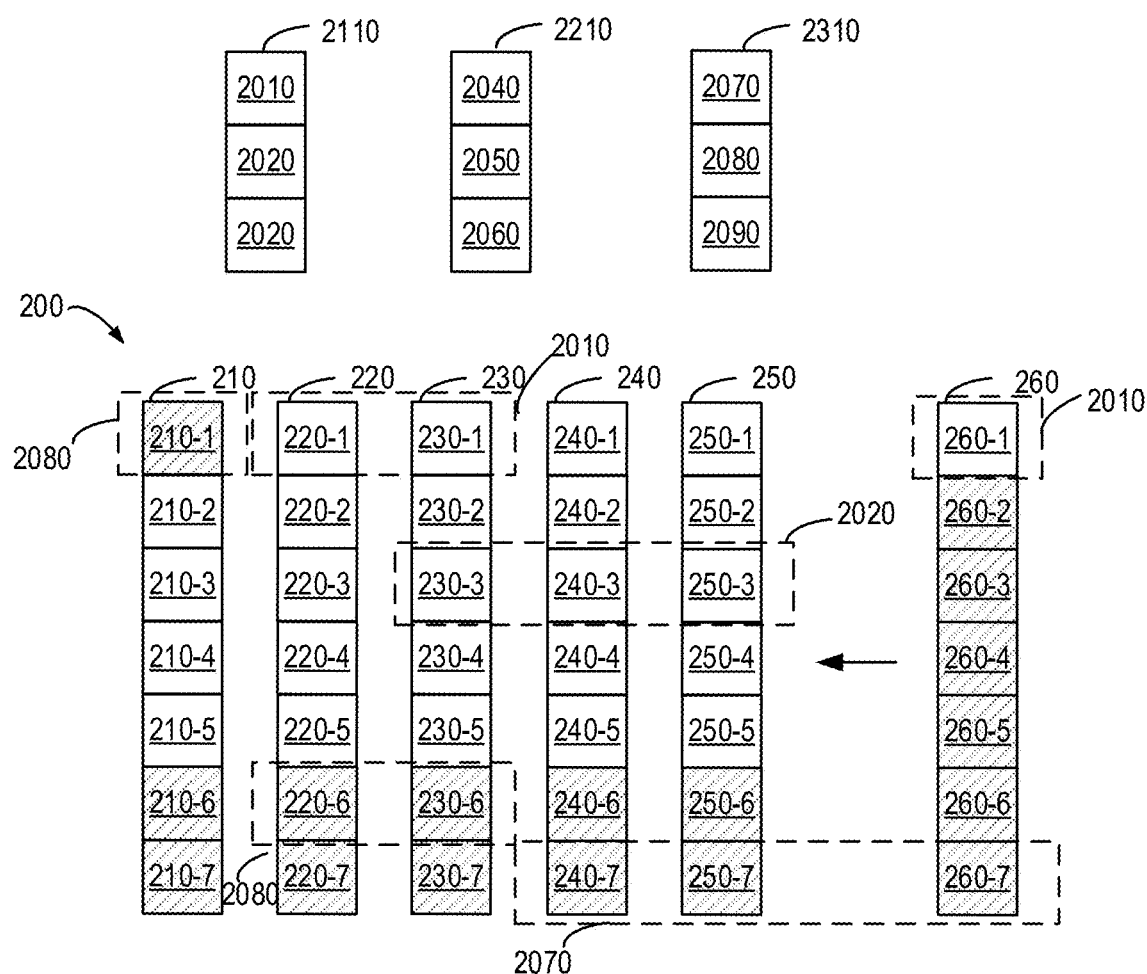

At block 320, during the shuffling operation which is executed after the storage device 260 is added into the storage system 200, the storage system 200 determines from the free storage extents target storage extents satisfying the width. As shown in FIG. 2B, only as an example, data on the storage extent 210-1 is transferred to the storage extent 260-1 during the shuffling operation. As shown in FIG. 2B, the free storage extents in the system 200 can include storage extents 210-6, 210-7, 220-6, 220-7, 230-6, 230-7, 240-6, 240-7, 250-6, 250-7, and storage extents 260-1 to 260-7. Because the width of the storage stripe group 2310 is 3, the target storage extents satisfying the width include any combinations of a plurality of storage extents at least from three different storage devices. Just as an example, the target storage extents can include storage extents 210-6, 230-7, 240-6, 260-6 and the like. The target storage extents cannot just include the storage extents 260-1 to 260-7 as they all come from the storage device 260.

In some embodiments, if the current free storage extents cannot satisfy the width requirement of the storage stripe group 2310, it can wait for the storage extents released during the shuffling operation to update the free storage extents. The storage system 200 then determines, based on the updated free storage extents, target storage extents satisfying the width. For example, after the shuffling operation, the storage extent 210-1 is released as free storage extent, and the free storage extents included in the storage system 200 are updated to 210-1, 210-6, 210-7, 220-6, 220-7, 230-6, 230-7, 240-6, 240-7, 250-6, 250-7, and storage extents 260-2 to 260-7.

In this way, embodiments of the present disclosure create the storage stripe group 2310 during the shuffling operation, rather than after the full completion of the shuffling operation of the storage system 200, so as to avoid long waiting time for creating the storage stripe group.

At block 330, the storage system 200 creates, based on the target storage extents, the storage stripe group 2310. FIG. 4 illustrates a flowchart of an example method 400 for creating a storage stripe group implemented at block 330. Example embodiments for creating the storage stripe group 2310 will be described with reference to FIGS. 2B to 2D and FIG. 4.

In this embodiment, the system 200 selects, at block 410, a group of storage extents 240-7, 250-7 and 260-7 from the target storage extents as shown in FIG. 2B. It can be understood that this group of storage extents is only by way of example and non-restrictive. The storage system 200 can select any appropriate storage extent from the target extent.

In the example embodiments, the system 200 maps, at block 420, physical address of the storage extents 240-7, 250-7 and 260-7 to a logical address of one storage stripe 2070 in the storage stripe group 2310 as shown in FIG. 2B. It can be understood that physical address of the storage extents 240-7, 250-7 and 260-7 can be mapped to the logical address of other suitable storage stripes.

In the example embodiments, the logical address of the storage stripe 2070 is mapped to the logical address of the storage stripe group 2310 at block 430. As described above, the mapping table that has already created the storage stripe group 2310 can record the above address mapping relationship into the mapping table in some embodiments.

In the example embodiments, the storage system 200 can determine, at block 440, a size of accessible storage space in the storage stripe group 2310. For example, the storage stripe 2070 has been mapped to the storage stripe group 2310 at block 430, so the storage space (namely, storage extents 240-7, 250-7 and 260-7) corresponding to the storage stripe 2070 in the storage stripe group 2310 is accessible. In the example, the storage system 200 determines a size of storage space corresponding to the storage stripe 2070. In some embodiments, if a new storage stripe is mapped to the storage stripe group 2310, the storage system 200 updates the size of the accessible storage space in the storage stripe group 2310.

In some embodiments, the storage system 200 can create a logic unit (LUN) on the storage stripe group 2310. For example, it can create FLARE LUN on the storage stripe group 2310, and related information of the created logic unit can be output to an upper-layer driver (for example, dynamic random-access memory (DRAM) or cache).

In some embodiments, LUN can transmit to the upper-layer drive size of the accessible storage space in the storage stripe group 2310 and its total storage space. The user can perform read and/or write operations on data via the LUN.

In the example embodiments, the storage system 220 can determine, at block 450, whether the accessible storage space is less than a total storage space indicated in the creation request. If the storage system 200 determines that the accessible storage space is smaller than the total storage space indicated in the creating request, the storage system 200 selects, at block 460, a further group of storage extents from the target storage extents for creating the storage stripe group 2310. For example, the storage extents 210-1, 220-6 and 230-6 can be selected as shown in FIG. 3. Similarly, the physical addresses of the storage extents 210-1, 220-6 and 230-6 are mapped to the logical address of the storage stripe 2080. The logical address of the storage stripe 2080 is mapped to the logical address of the storage stripe group 2310.

In the example embodiments, if the storage system 200 can determine the size of the accessible storage space is not less than the total storage space indicated in the creating request, the storage system 200 at block 470 marks the storage stripe group 2310 as fully accessible. For example, the storage stripes 2070, 2080 and 2090 are all mapped to the storage stripe group 2310, and the storage space corresponding to the storage stripes 2070, 2080 and 2090 is identical to or greater than the indicated total storage space, and the storage space of the storage stripe group 2310 is fully accessible.

In this way, embodiments of the present disclosure support partial mapping of the storage stripe group, such the storage space resources that have been mapped to the storage stripe group can be rapidly utilized.

It can be understood that the method shown in FIG. 4 is only by way of example and non-restrictive. The storage system 200 also can create the storage stripe group 2310 in any other suitable manners at block 330. For example, the storage system 200 maps the physical address of the storage extents 240-7, 250-7 and 260-7 to the logical address of one storage stripe 2070 in the storage stripe group 2310. The storage system 220 can add the identification of the storage stripe group 2310 into the storage stripe 2070.

Figure 5:
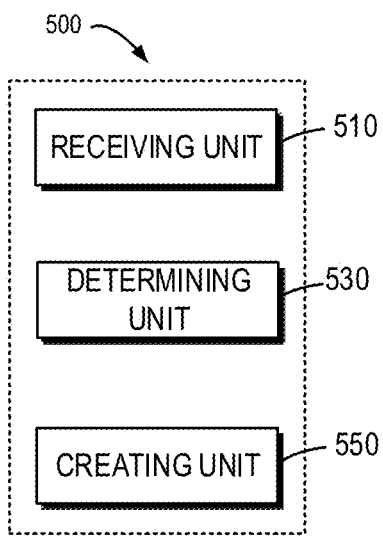
FIG. 5 illustrates a schematic block diagram of an apparatus 500 for implementing embodiments of the present disclosure.

FIG. 5 illustrates a schematic block diagram of an apparatus 500 according to embodiments of the present disclosure. For example, the method 300 and the method 400 shown in FIGS. 3 and 4 can be performed by the apparatus 500. As shown, the apparatus 500 can include a receiving unit 510, a determining unit 530 and a creating unit 550. The receiving unit 510 is configured to: receive a creating request for a storage stripe group 2310 in the storage system 200. The creating request indicates a width of the storage stripe group 2310 to be created. The determining unit 520 is configured to: determine target storage extents satisfying the width from the free storage extents in the storage system during the shuffling operation executed after a storage device is added to the storage system.

In some embodiments, the determining unit 520 is configured to: in response that the free storage extents in the storage system 200 do not satisfy the width, update the free storage extents with the storage extent released from the shuffling operation. In some embodiments, the determining unit 520 is configured to determine, based on the updated free storage extents, target storage extents satisfying the width.

The creating unit 530 is configured to create the storage stripe group based on the target storage extents. In some embodiments, the creating unit 530 is configured to select a group of storage extents from the target storage extents. Alternatively or additionally, the creating unit 530 also can be configured to map the physical address of a group of storage extents to the logical address of a storage stripe, and map the logical address of the storage stripe to the storage stripe group.

In some embodiments, the creating unit 530 is configured to determine the size of accessible storage space in the storage stripe group. In some embodiments, if the accessible storage space is less than the total storage space indicated in the creation request, the creating unit 530 can be configured to select a further group of storage extents from the target storage extents for creating the storage stripe group.

In the example embodiments, the creating unit 530 can be configured to create a logic unit about the storage stripe group. In the example embodiment, the creating unit 530 also can be configured to output the information associated with the logic unit for accessing the storage stripe group.

In some embodiments, the apparatus 500 also can include a transmitting unit (not shown). The transmitting unit can be configured to transmit to the upper-layer drive information indicating the storage space accessible by the storage stripe group.

Figure 6:
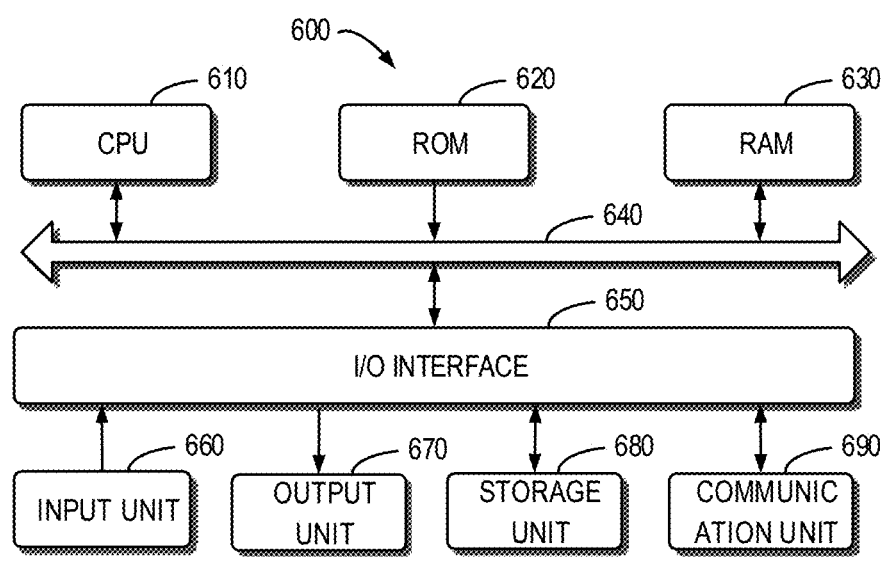
FIG. 6 illustrates a schematic block diagram of a device 600 for implementing embodiments of the present disclosure.

FIG. 6 illustrates a schematic block diagram of an example device 600 for implementing embodiments of the present disclosure. As shown, the device 600 includes a central process unit (CPU) 610, which can execute various suitable actions and processing based on the computer program instructions stored in the read-only memory (ROM) 620 or computer program instructions loaded in the random-access memory (RAM) 630 from a storage unit 680. The RAM 630 can also store all kinds of programs and data required by the operations of the device 600. CPU 610, ROM 620 and RAM 630 are connected to each other via a bus 640. The input/output (I/O) interface 650 is also connected to the bus 640.

A plurality of components in the device 600 is connected to the I/O interface 650, including: an input unit 660, such as keyboard, mouse and the like; an output unit 670, e.g., various kinds of display and loudspeakers etc.; a storage unit 680, such as disk and optical disk etc.; and a communication unit 690, such as network card, modem, wireless transceiver and the like. The communication unit 690 allows the device 600 to exchange information/data with other devices via the computer network, such as Internet, and/or various telecommunication networks.

The above described each procedure and processing, such as method 300 and method 400, can also be executed by the processing unit 610. For example, in some embodiments, the method 300 and method 400 can be implemented as a computer software program tangibly included in the machine-readable medium, e.g., storage unit 690. In some embodiments, the computer program can be partially or fully loaded and/or mounted to the device 600 via ROM 620 and/or communication unit 690. When the computer program is loaded to RAM 630 and executed by the CPU 610, one or more actions of the above described method 300 and method 400 can be implemented.

The present disclosure can be method, device and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processor of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by method, device and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the disclosure aims to best explain principles and actual applications of each implementation and technical improvements made in the market by each embodiment, or enable other ordinary skilled in the art to understand implementations of the present disclosure.

We claim:

1. A method of managing a storage system, the storage system including a plurality of storage devices, the method comprising:
   receiving a creating request for creating a group of storage stripes of the storage system, the creating request indicating a width of the group of storage stripes to be created;
   in response to adding a storage device to the storage system, initiating redistribution of data across the plurality of storage devices and the added storage device, the initiating redistribution of data comprising:
      transferring all data from a first plurality of storage extents on the plurality of storage devices to a second plurality of storage extents on the added storage device, respectively, the first plurality of storage extents having all of its data transferred being referred to herein as a plurality of free storage extents; and
   performing, before the redistribution of data is completed, acts comprising:
      initiating creation of the group of storage stripes, the initiating creation comprising:
         obtaining a first plurality of target storage extents satisfying the width from at least the plurality of free storage extents on the plurality of storage devices;
         selecting, from the first plurality of target storage extents, a first group of free storage extents on at least different ones of the plurality of storage devices, respectively, the first group of free storage extents having a first number of free storage extents corresponding to the width of the group of storage stripes; and
         performing partial mapping of free storage extents to the group of storage stripes, the partial mapping comprising:
            mapping a physical address of the first group of free storage extents to a logical address of a first storage stripe of the group of storage stripes; and
            mapping the logical address of the first storage stripe to a logical address of the group of storage stripes, a size of accessible storage space in the group of storage stripes corresponding to a size of storage space in the first group of free storage extents; and
      accessing the storage space in the first group of free storage extents mapped to the first storage stripe of the group of storage stripes.

2. The method of claim 1, wherein the creating request further indicates a total accessible storage space in the group of storage stripes to be created, and wherein the initiating creation of the group of storage stripes further comprises:
   determining that the size of accessible storage space is less than the total accessible storage space indicated in the creating request; and
   in response to determining that the size of accessible storage space is less than the total accessible storage space indicated in the creating request, selecting, from the first plurality of target storage extents, at least a second group of free storage extents on at least different ones of the plurality of storage devices, respectively, the second group of free storage extents having a second number of free storage extents corresponding to the width of the group of storage stripes.

3. The method of claim 2, wherein the performing partial mapping further comprises:
   mapping a physical address of the second group of free storage extents to a logical address of a second storage stripe of the group of storage stripes;
   mapping the logical address of the second storage stripe to the logical address of the group of storage stripes; and
   updating the size of accessible storage space in the group of storage stripes to a total combined size of (i) the size of storage space in the first group of free storage extents mapped to the first storage stripe of the group of storage stripes and (ii) a size of storage space in the second group of free storage extents mapped to the second storage stripe of the group of storage stripes.

4. The method of claim 3, further comprising:
   marking the group of storage stripes as having storage space that is fully accessible.

5. The method of claim 1, further comprising:
   obtaining a second plurality of target storage extents from at least the plurality of free storage extents on the plurality of storage devices;
   in response to the second plurality of target storage extents failing to satisfy the width, waiting for one or more additional storage extents to be released during the redistribution of data; and updating the second plurality of target storage extents using the one or more additional storage extents released by the redistribution of data.

6. The method of claim 1, wherein the initiating creation of the group of storage stripes further comprises:

creating a logical unit related to the group of storage stripes; and outputting information associated with the logical unit for accessing the accessible storage space in the group of storage stripes.

7. The method of claim 1, further comprising:

transmitting, to a volatile drive memory, information indicating the accessible storage space in the group of storage stripes.

8. A device for managing a storage system, comprising:

a plurality of storage devices;

at least one processing unit; and at least one memory coupled to the at least one processing unit and stored with instructions, the instructions, when executed by the at least one processing unit, performing acts comprising:

receiving a creating request for creating a group of storage stripes of the storage system, the creating request indicating a width of the group of storage stripes to be created in response to adding a storage device to the storage system, initiating redistribution of data across the plurality of storage devices and the added storage device, the initiating redistribution of data comprising:

transferring all data from a first plurality of storage extents on the plurality of storage devices to a second plurality of storage extents on the added storage device, respectively, the first plurality of storage extents having all of its data transferred being referred to herein as a plurality of free storage extents; and performing, before the redistribution of data is completed, acts comprising:

initiating creation of the group of storage stripes, the initiating creation comprising:

obtaining a first plurality of target storage extents satisfying the width from at least the plurality of free storage extents on the plurality of storage devices;

selecting, from the first plurality of target storage extents, a first group of free storage extents on at least different ones of the plurality of storage devices, respectively, the first group of free storage extents having a first number of free storage extents corresponding to the width of the group of storage stripes; and performing partial mapping of free storage extents to the group of storage stripes, the partial mapping comprising:

mapping a physical address of the first group of free storage extents to a logical address of a first storage stripe of the group of storage stripes; and mapping the logical address of the first storage stripe to a logical address of the group of storage stripes, a size of accessible storage space in the group of storage stripes corresponding to a size of storage space in the first group of free storage extents; and accessing the storage space in the first group of free storage extents mapped to the first storage stripe of the group of storage stripes.

9. The device of claim 8, wherein the creating request further indicates a total accessible storage space in the group of storage stripes to be created, and wherein the initiating creation of the group of storage stripes further comprises:

determining that the size of accessible storage space is less than the total accessible storage space indicated in the creating request; and in response to determining that the size of accessible storage space is less than the total accessible storage space indicated in the creating request, selecting, from the first plurality of target storage extents, at least a second group of free storage extents on at least different ones of the plurality of storage devices, respectively, the second group of free storage extents having a second number of free storage extents corresponding to the width of the group of storage stripes.

10. The device of claim 8, further comprising:

obtaining a second plurality of target storage extents from at least the plurality of free storage extents on the plurality of storage devices:

in response to the second plurality of target storage extents failing to satisfy the width, waiting for one or more additional storage extents to be released during the redistribution of data; and updating the second plurality of target storage extents using the one or more additional storage extents released by the redistribution of data.

11. The device of claim 8, wherein the initiating creation of the group of storage stripes further comprises:

creating a logical unit related to the group of storage stripes; and outputting information associated with the logical unit for accessing the accessible storage space in the group of storage stripes.

12. The device of claim 8, wherein the acts further comprise:

transmitting, to a volatile drive memory, information indicating the accessible storage space in the group of storage stripes.

13. A computer program product having a non-transitory computer readable medium which stores a set of instructions for managing a storage system, the storage system including a plurality of storage devices, the set of instructions, when carried out by computerized circuitry, causing the computerized circuitry to perform a method comprising:

receiving a creating request for creating a group of storage stripes of the storage system, the creating request indicating a width of the group of storage stripes to be created;

in response to adding a storage device to the storage system, initiating redistribution of data across the plurality of storage devices and the added storage device, the initiating redistribution of data comprising:

transferring all data from a first plurality of storage extents on the plurality of storage devices to a second plurality of storage extents on the added storage device, respectively, the first plurality of storage extents having all of its data transferred being referred to herein as a plurality of free storage extents; and performing, before the redistribution of data is completed, acts comprising:

initiating creation of the group of storage stripes, the initiating creation comprising:

obtaining a first plurality of target storage extents satisfying the width from at least the plurality of free storage extents on the plurality of storage devices;

selecting, from the first plurality of target storage extents, a first group of free storage extents on at least different ones of the plurality of storage devices, respectively, the first group of free storage extents having a first number of free storage extents corresponding to the width of the group of storage stripes; and performing partial mapping of free storage extents to the group of storage stripes, the partial mapping comprising:

mapping a physical address of the first group of free storage extents to a logical address of a first storage stripe of the group of storage stripes; and mapping the logical address of the first storage stripe to a logical address of the group of storage stripes, a size of accessible storage space in the group of storage stripes corresponding to a size of storage space in the first group of free storage extents; and accessing the storage space in the first group of free storage extents mapped to the first storage stripe of the group of storage stripes.

* * * * *